United States Patent [19]

Fredriksson

[11] Patent Number: 6,000,825
[45] Date of Patent: Dec. 14, 1999

[54] METHOD AND ARRANGEMENT FOR A MODULE WHICH CAN BE CONNECTED TO A SERIAL AND DIGITAL NETWORK SYSTEM

[76] Inventor: Lars-Berno Fredriksson, Berggränd 1, Kinna, Sweden, 51100

[21] Appl. No.: 08/954,560

[22] Filed: Oct. 20, 1997

Related U.S. Application Data

[63] Continuation of application No. 08/514,410, Aug. 11, 1995, abandoned.

[30] Foreign Application Priority Data

Aug. 11, 1994 [SE] Sweden .................................. 9402683

[51] Int. Cl.⁶ .............................. G06F 13/00; G06F 19/00
[52] U.S. Cl. ......................... 364/138; 364/132; 364/131; 364/140.01; 709/208; 709/211
[58] Field of Search ..................................... 364/138, 139, 364/132, 131, 140.01; 395/200.38, 200.41; 709/208, 211

[56] References Cited

U.S. PATENT DOCUMENTS

| | | | |
|---|---|---|---|
| 4,304,001 | 12/1981 | Cope | 371/8 |
| 4,410,983 | 10/1983 | Cope | 395/280 |
| 4,438,666 | 3/1984 | Burgiss | 395/280 |
| 4,539,655 | 9/1985 | Trussell et al. | 395/280 |
| 4,841,450 | 6/1989 | Fredriksson | 364/468 |
| 5,072,374 | 12/1991 | Sexton et al. | 395/200.38 |
| 5,383,116 | 1/1995 | Lennartsson | 364/138 |
| 5,446,846 | 8/1995 | Lennartsson | 395/250 |

OTHER PUBLICATIONS

Dallas Semiconductor Corporation, "Semiconductor memory chips/Touch Memory chips", pp. 1–72, Feb. 1994.

*Primary Examiner*—Tariq R. Hafiz
*Assistant Examiner*—Tuan Q. Dam

[57] ABSTRACT

An arrangement to control equipment over a common network. A serial network transfers commands, and receives data from a plurality of distributed locations. Equipment located at each location executes tasks based on control information received over the network. Each equipment includes a memory which contains data to identify to the serial network, the identity of functions carried out by the equipment. Sensors may be located at some of the locations for generating data for transmission over the network. Each sensor also has a memory which identifies the sensor to the serial network. The plurality of modules connecting each of the equipment and the sensors to the network are configured to read the memory contents to carry out the function identified of the connected equipment or sensor.

23 Claims, 8 Drawing Sheets

| | MEMORY SENSOR A | B | C | D | E | F | G |
|---|---|---|---|---|---|---|---|
| Type | BETA 2500 | BETA 2500 | BETA 2500 | BETA 1500 | BETA 1500 | BETA 500 | BETA 500 |
| Serial No. | 181 778 | 160 078 | 181 772 | 160 445 | 162 248 | 160 350 | 160 348 |
| RATED VOLTAGE | 10V | 10V | 10V | 10V | 10V | 10V | 10V |
| Max. supply | 3m V/V ±0.5% | 3m V/V ±0.5% | 3m V/V ±0.5% | 3m V/V ±0.5% | 3m V/V ±0.5% | 3m V/V ±0.5% | 3m V/V ±0.5% |
| Calibration value | | | | | | | |
| 40 kΩ | 128.2 bar | 117.6 bar | 122.3 bar | 74.54 bar | 80.18 bar | 25.2 bar | 25.7 bar |
| 80 kΩ | 64.3 | 68.0 | 61.4 | 37.34 | 40.17 | 12.6 | 12.9 |
| 160kΩ | 32.2 | 33.7 | 30.6 | | | | |
| Max. pressure | 172.3 bar | 172.3 bar | 172.3 bar | 103.4 bar | 103.4 bar | 34.5 bar | 34.5 bar |

FIG. 7

| Type | PT 310 JA-15 | |
|---|---|---|
| Input resistance | 358 Ω | |
| Output resistance | 367 Ω | |
| Zero load | + 0,033 m V/V | |
| Full load | 3,227 m V/V | |
| 80 % load | 2,584 m V/V | |
| Internal start | 2,575 m V/V | |
| Max. pressure | 1,034 bar | |
| Serial No. | 138276 | |

METHOD AND ARRANGEMENT FOR A MODULE WHICH CAN BE CONNECTED TO A SERIAL AND DIGITAL NETWORK SYSTEM

This application is a continuation of U.S. patent application Ser. No. 08/514,410, filed Aug. 11, 1995, now abandoned.

TECHNICAL FIELD

The present invention relates to an system having an electronically operating module which is connected or can be connected to a digitally and serially operating network system, preferably the so-called CAN system (Controller Area Network, ISO 11898). In such a system, the respective module is capable of carrying out functions such as executing tasks or assignments with or on equipment which is associated with the module. One or more of said functions for executing tasks or assignments, e.g. control, reading etc., can be designated or activated for the respective task or assignment execution by means of one or more selections or adjustments. The invention can also be used in an arrangement which carries out and/or forwards measurements or results of measurement from connected sensor units. Said sensor units can be connected one or more at a time to the system. The invention can also be used in a method where the modules can be connected to serially operating network systems and where equipment which can be acted upon by the system is connected to the respective module.

STATE OF THE ART

The present invention can be connected to the type of module and connecting member which are described in Swedish patent 466726. According to the latter, the respective module can be connected to serial and digital networks of said type. Characteristic of systems belonging to this type is that they comprise a bus or wire connection, to which a number of electronic modules are connected. In association with the known systems, it has been proposed to provide the interface function between module and network with a memory member which stores information on the peculiarities, functions, variants etc. of the system. In the known system, an overriding control unit can be included or chosen among said modules. Also characteristic of the system is that there can be connected to the electronic modules equipment which is controlled from the system by the modules.

It is also previously known in such systems to introduce memory members as key functions and the like, which memory members can be read from the system and module in association with an authentication function.

TECHNICAL PROBLEM

It is important in systems of this type to facilitate system and module removals for mutually independent experts to carry out. It is also important that the application function is facilitated and that systems and the modules can be adapted to different application areas. Likewise, the connectability of the equipment in question is to be facilitated and the system is as far as possible to be capable of adaptation between systems, modules and equipment, i.e. without great effort on the part of the user. The main aim of the invention is to solve this problem.

The electronic modules can, for their connections to appropriate serial networks, when intended for machine or process control systems, be designed so that they are capable of performing a number of different tasks depending on the measuring and/or control equipment to which they are connected. The present invention also solves the problem of how the knowledge of the intended function is to originate and be utilized. Guided by the knowledge, the modules and/or the system can adapt. The invention also solves the problem of how, to select inputs to be read for measurements, and how to select outputs for a control function, as well as selection of correction factors in calculation algorithms, a selection of amplification factors, attenuation factors, reading and modulation periods etc. The term "selection" is here also synonymous with direct reading of one or more numerical values which can be utilized in suitable algorithms for adapting the attributes of the module to the intended function.

The invention also solves the problem that, from the outset, the system does not need to know to which hardware the module is connected.

In the manufacture of hydraulic servo valves, for example, these cannot be made identical, item for item. During manufacture, it is necessary to allow given tolerances and, depending on the outcome of these tolerances, each individual item has slightly different tolerances. In order to compensate for the tolerance outcome, calibration values are introduced into the electronics, and this functions well as long as the electronics are not exchanged. The electronics also have tolerances in themselves but, since calibration must still be carried out, a joint calibration of module and connected equipment is often been carried out. The electronic modules can be calibrated with regard to their electrical attributes so that they are mutually exchangeable. The remaining calibration values originate only from connected equipment. By measuring and utilizing these calibration values, it is possible according to the invention to make the respective module adapt to individual connect items of equipment and for there to be complete exchangeability between modules.

The invention also solves the problem of increased system reliability. Assembly faults can be detected and/or system adaptations can be carried out without intervention in the central system by an operator. A module can be designed so that it is capable of controlling different types of motor. In the system, it is presupposed that a given type of motor will be connected at a given point in the network. If the motor is exchanged and the wrong type of motor is connected, a supervising unit can find this out. The module which is connected to the network utilizes said knowledge about the exchanged motor, e.g. type information. The module communicates the connected motor type to the supervising unit which finds that the connected type does not correspond to the type which is stored in the system memory data bank. The system does not start up but instead gives an error report to the operator.

The present invention also makes it possible for the system to be made for different types of equipment and for the attributes of the system to be adapted according to the connected equipment. In this respect a crane can be made so that either a hook, gripping claw or a winch can be connected. The manipulation by the operator of control levers and buttons will lead to entirely different control commands over the serial network depending on which equipment is connected. The electronic equipment in the node/module can control and identify both gripping claw and winch and also indicate whether there is a load sensor in the hook and read the sensor. By means of knowledge about the connected equipment and messages to the control equipment about the same, both module and system adapt to the equipment connected at the time. If the hook is of the most simple type, e.g. without electrical equipment, it remains necessary to have information about the hook. The task of the module is in this case be to identify the hook and communicate this to the overriding unit which adapts the system so that the functions which will not be used in the configuration are disconnected, e.g. weight-related functions based on a weighing machine and a control for a winch or gripping claw. The invention also makes it possible for the mechanism to provide the knowledge only if the hook is correctly mounted. Even in the connection of purely mechanical units, the invention can in this manner solve the problem of system safety.

Calibration values can be changed with time, e.g. by wear and ageing. Modules can be designed so that they measure these changes by statistical processing of measurement data. This has until now meant that a module must have been connected to the unit or equipment for a long time in order to have been capable of performing its task. By utilizing the knowledge about the application time of the connected equipment in a manner which is characteristic of the invention, calculation algorithm partial results can be stored in the connected unit and a newly connected module can take over monitoring of said ageing, wear etc. and calculations can be resumed by the new module where the previous or exchanged module stopped.

The invention also solves the problem of prescribed service after a given operating time for certain equipment. If the equipment in question can be used in a number of systems, an administrative system is required to follow up the operating time. By procuring knowledge about the operating time on connection and adding current operating time and also making use of the knowledge, this problem also is solved in a simple manner by the invention.

SUMMARY OF THE INVENTION

The main characteristic of an arrangement which solves the problems indicated above is that the respective equipment which is connected to a module is assigned a memory member which contains information which is characteristic of the equipment, and the module read out said information and, depending on the result of reading carries out the respective selection or adjustment(s).

Implementing the inventive idea, the module identifies the type of equipment by reading. An identification of a first equipment type can then bring about a first network system function which differs from a second network system function assigned to of a second equipment type, and so forth. The respective function for executing tasks or assignments can be established by means of signal exchange between the respective module and the equipment connected. The signalling between the module and the respective equipment can be one-way or two-way. The modules can be calibrated with regard to their electrical attributes in order to be mutually exchangeable. In the event that connection of incorrect equipment takes place, information about this can be sent out to the module and/or the system (the supervising unit). The operator of the system can in this manner obtain information about the incorrect connection in question.

The module can also sense changes occurring in the equipment, e.g. wear, ageing etc. in the same. This can take place by, during one or more periods of time, when measurements are being carried out on the equipment. Measurement results can be processed statistically. The respective module can also write in information which originates from the respective measurement and/or processing which affects the equipment. The written-in information may be accessible from another module which replaces the first module.

In a preferred embodiment, the respective module is provided with one or more of its own memory members for data, by means of which the module can be adapted to different variants of communication in the network system, to perform different functions in the network system, or for connection to different network systems.

A method according to the invention is characterized in that, before the respective task and/or adjustment execution, information about the connected equipment is read from a memory member, associated with the equipment, by the respective module in question and the module is adjusted or adapted to the equipment before the respective task or assignment execution is started. In one embodiment, the respective module can then be adapted to the network system by means of first data/information situated in a first memory member of the module and characteristic of the system, and adapted to connected equipment by means of second data/information in a second memory member belonging to the equipment.

A method according to the invention can also be considered as being characterized in that the equipment is associated with memory members, and that information or data belonging to the equipment, in the form of characteristic(s), parameter(s), adjustment(s) etc., is introduced into the memory member, and read by the module and/or the system, peculiarities appearing in the equipment which do not correspond with the system characteristic and/or the module are compensated by means of an adaptation executed depending on the reading information or data.

An arrangement according to the invention can also be considered as being characterized in by a respective sensor unit having an associated memory which contains information, by means of which the module can be calibrated electrically with regard to type and/or calibration values which originate from the respective connected sensor unit.

Further characteristics of the invention emerge from the following patent claims.

LIST OF FIGURES

A for the present proposed embodiment of an arrangement which has the characteristics which are significant to the invention will be described below with simultaneous reference to the attached drawings in which.

DETAILED EMBODIMENT

Figure 1:
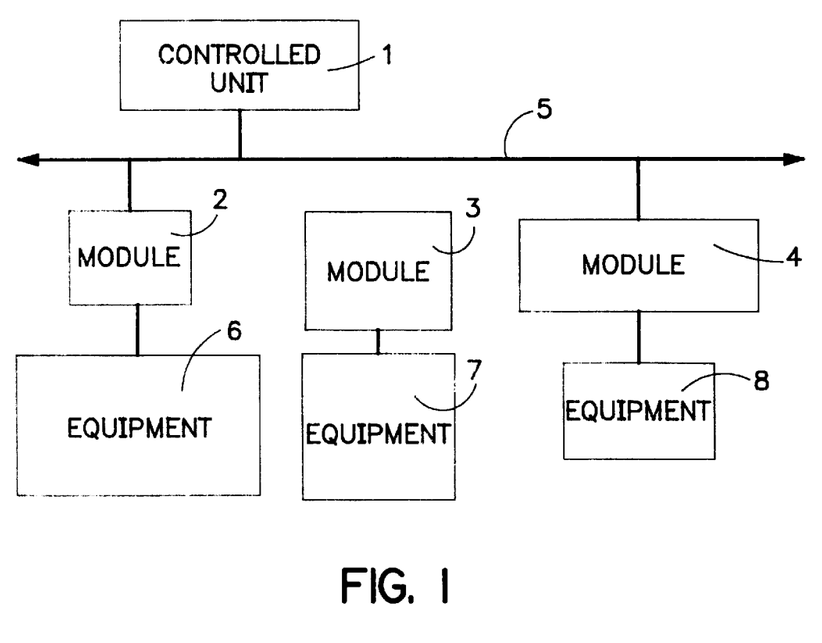
FIG. 1 shows schematically in block diagram form parts of control and module units belonging to a network system.

In FIG. 1, parts of a CAN system are shown, in which a controlled unit is indicated by 1 and a number of electronic modules connected to or forming part of the system are indicated by 2, 3 and 4. The connections are made to a bus 5 in the CAN system. Equipment 6, 7 and 8 respectively is connected to the respective module.

Figure 2:
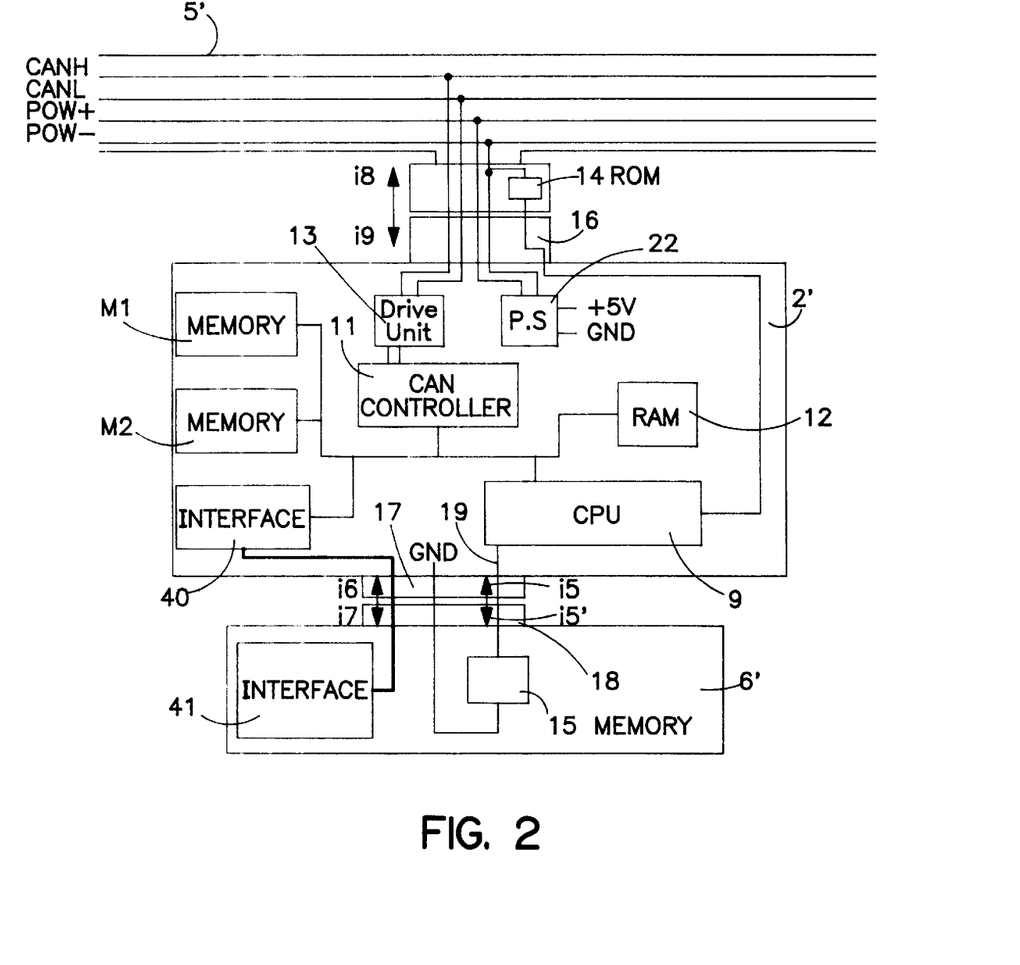
FIG. 2 shows, in block diagram form, connecting members between a network system and a module belonging thereto and also equipment connected to the module, the module and the equipment being assigned memory members.

According to FIG. 2, the respective module 2' can be considered to constitute a "flexible" module with a microcomputer CPU which has the designation 9, a CAN drive unit 13, a CAN controller 11 and internal memory members which can be constituted by a so-called RAM memory 12. Further memories can be included and two such memories are indicated symbolically by M1, M2. The module has a voltage supply unit 22 connected to the bus 5'. In a known manner, the module 2' is associated with a first memory member 14 which contains information/data about the network (the CAN system). According to the invention, the connectable equipment (hardware) 6' is to be provided with a memory member 15, here called the second memory member. The module 2' has a first contact member 16 for connection to the bus connection and a second contact member 17 for connectability to a corresponding contact member 18 in or on the equipment 6'. Interfaces 40 and 41 provide for control signals between the equipment 6 and module 2'.

On connection of the equipment 6' to the module (or vice versa), a connection is set up or activated between the CPU unit 9 and the memory member 15 via a schematically indicated connection 19 which can be a wire connection, induction connection etc. The CPU unit 9 can subsequently read and/or write information/data from and to the memory 15. The contact members 16, 17 and 18 can be constituted by contact members known per se or connections which include a contact-establishing function between the CPU unit and the memory member 15. The module 2' with the control unit 11 can on the bus side adapt to different variants of communication, functions etc. in or of the CAN system and on the equipment side adapt to connected equipment. The memory 15 contains information on the characteristic attributes, type, parameters etc. of the equipment.

With regard to the memory 15, e.g. two types of especially suitable memory can be used. The first type is constituted by Philips PCF 7930×P 12 while the second type can be constituted by Dallas DS 2502. The former memory requires no electrical connection as both energy and the signal can be transferred inductively. The latter type requires two connections, one connection of which is a combined voltage and signal connection and the other connection of which is a connection to earth. Both types of memory are produced for identification purposes. The Philips type is generally known as PIT (Programmable Identification Type).

Figure 3:
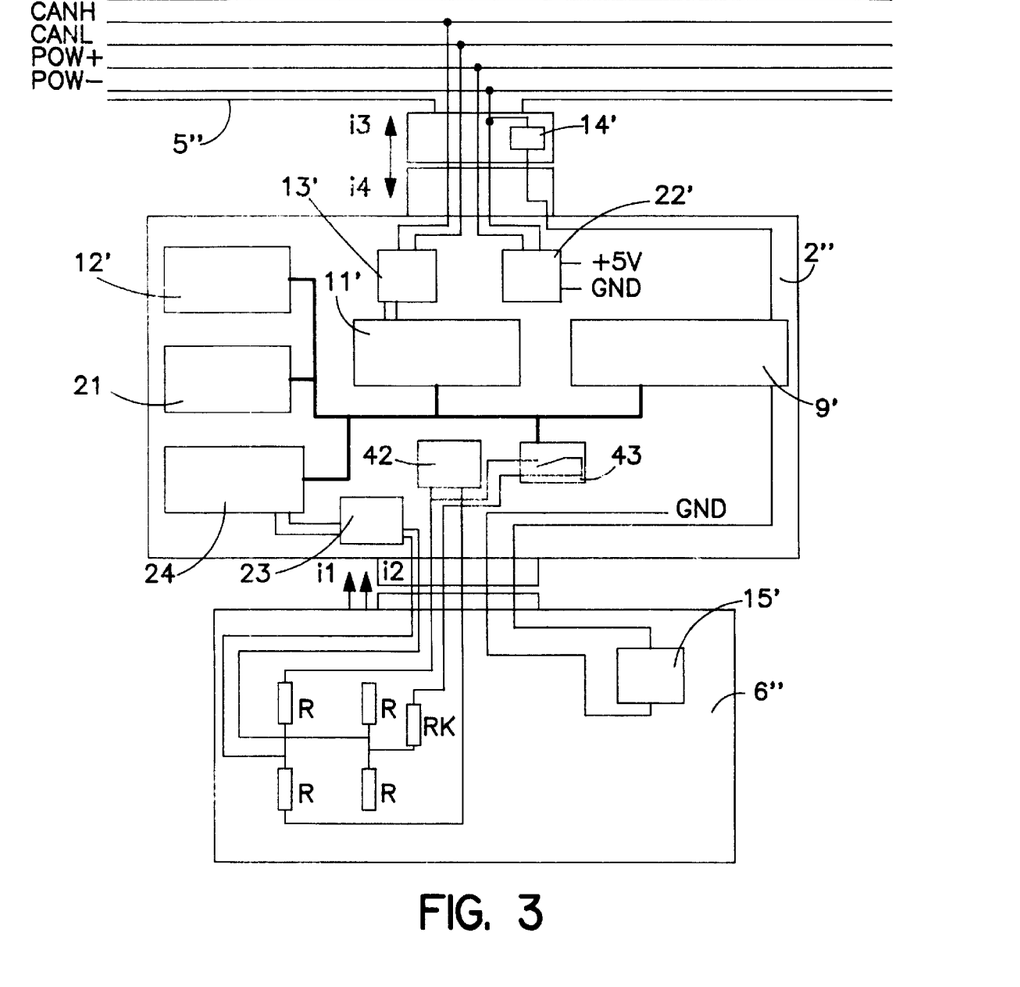
FIG. 3 shows in schematic diagram form a system bus, module and a sensor unit (equipment)

According to FIG. 3, the respective connectable equipment 6" can consist of sensor units which have been connected one by one or groupwise at a time, FIG. 3 showing the connection of a sensor unit which includes a resistive strain gauge (electrical strain gauge) with resistors R connected in a bridge in a known manner. For calibration, use is made of so-called shunt loading which is effected with a shunt resistor or calibration resistor Rk. Connection of the latter leads to measurable signal imbalance in the bridge. The bridge can form part of a load sensor, weighing machines etc. which are loaded with precisely known forces before delivery. Different calibration resistors are connected when the force sensor or equivalent is unloaded and the output voltage from the bridge is read. In this manner, different forces which correspond to different loads can be determined. The calibration can take place electrically by the calibration resistor being connected temporarily before, and/or after, the respective measurement. The CPU unit 9' carries out the readings during the calibration procedure and can adapt/calibrate the module in the measurement system in question with the sensor unit(s) in question. The sensor unit (load cell, weighing machine etc.) has its calibration values introduced into the memory member 15' which can be constituted by a DALLAS memory of the DS 2502 type.

Figure 4:
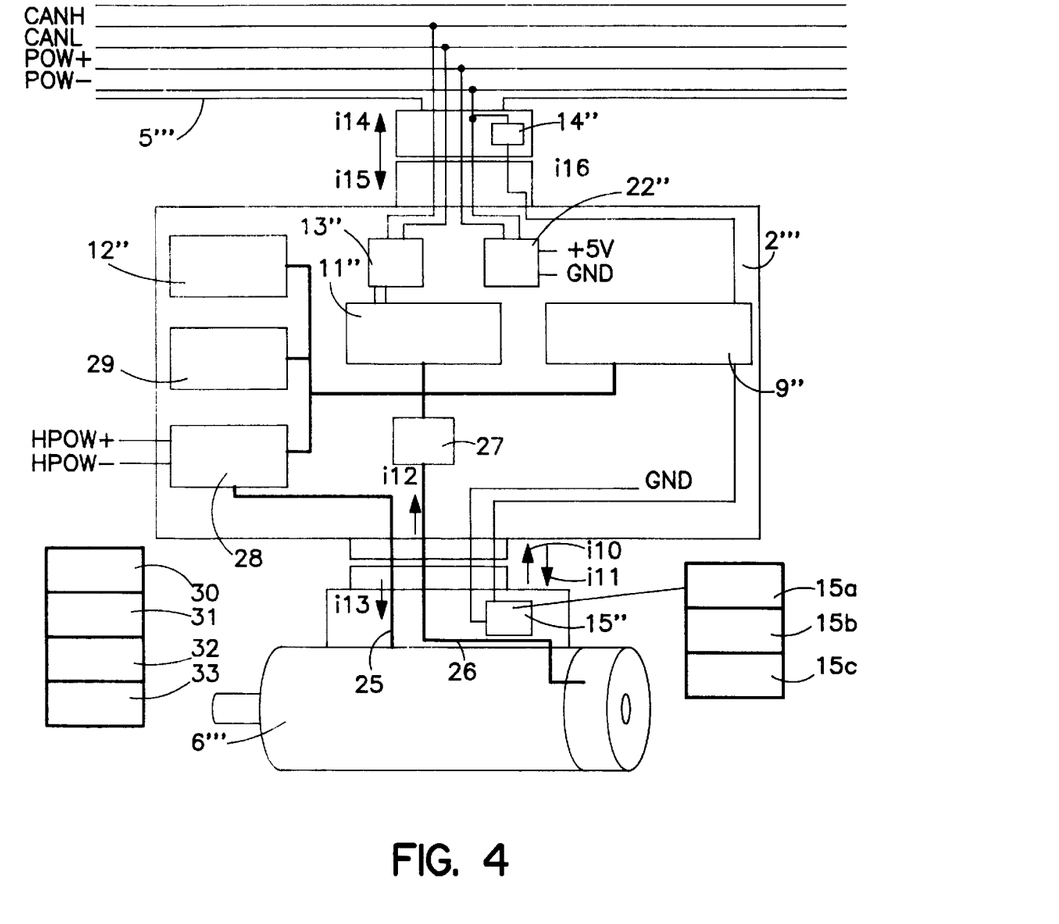
FIG. 4 shows in schematic diagram form a system bus, module and equipment in the form of a motor or generator member.
Figure 5A:
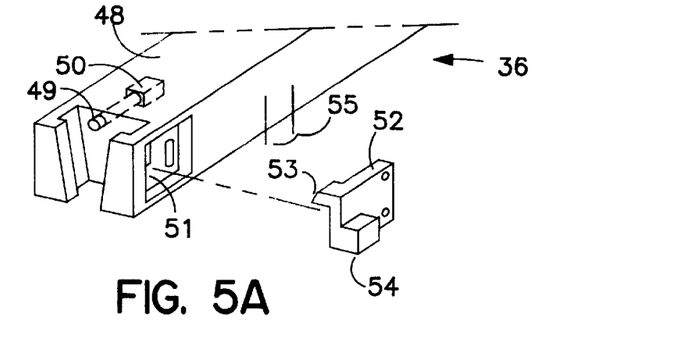
FIGS. 5–5e show different types of equipment with memory members.
Figure 5B:
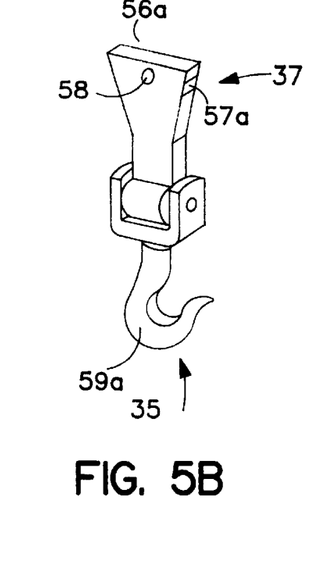
Figure 5C:
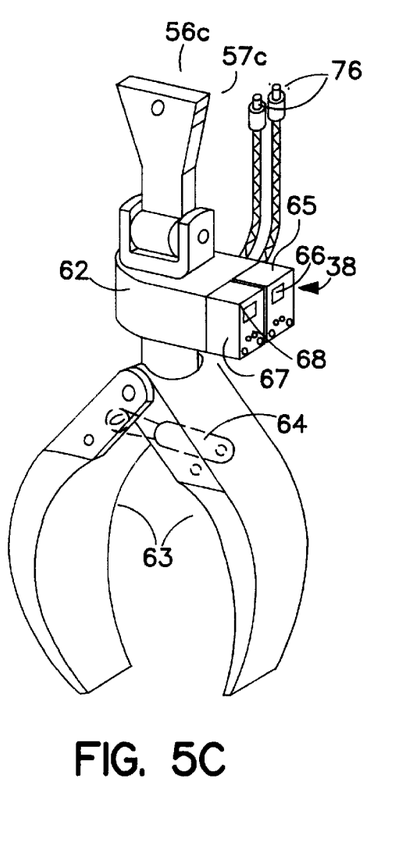
Figure 5D:
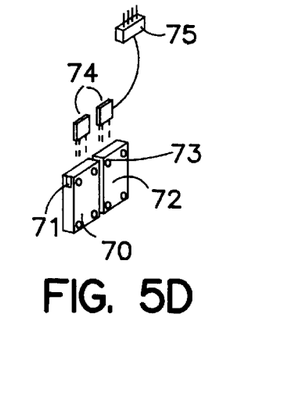
Figure 5E:
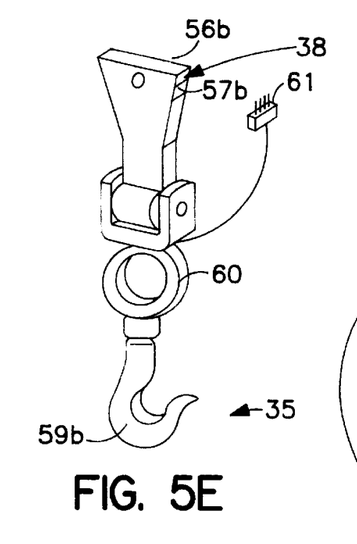

Characteristic of the weighing machines, load cells etc. which are provided with said electrical strain gauges is that they can be read by the same type of instrument which must then be calibrated to the respective connected sensor unit, both to the type and to the individual item. The module according to FIG. 3 functions as an instrument which can read said pressure sensor and weighing machines one by one at a time. The respective sensor unit is provided with its memory 15' which contains data or information according to the table according to FIG. 7. In the present case, a sensor unit which contains information/data 20 is indicated, which has the type indication 1500, serial number indication 160 445, rated voltage indication of 10 volts and so on. In the table, information or data for seven different sensor units A, B, C, D, E, F and G has been shown, the example according to FIG. 3 including information/data 20 for the sensor unit D. In FIGS. 3 and 4, the components corresponding to the components in FIG. 2 have been given the same reference designations supplemented with ' and " and '" marks. A ROM memory 21 is added in this case. The CPU unit 9' takes care of reading via a measuring amplifier 23 and an A/D converter 24. The CPU unit processes read values in a known manner by means of programs known per se. After calibration, sensing or reading by the equipment 6" takes place in a manner which is conventional per se. Calibration signals are indicated in FIG. 3 by i1 and reading signals by i2. Communication signals between the module and the CAN system are indicated by i3 and i4. The exchange signals in FIG. 2 are indicated by is (reading signals), i5', (any writing signals). Control or exchange signals between interface units 40 and 41 in the module or the equipment via a connection are indicated by i6, i7 and control or exchange signals between the module and the system are indicated by i8 and i9.

FIG. 4 shows the case with equipment in the form of a motor 6'". The module can control different types of motor and different variants of the motors. The respective motor 6'" has a memory 15", in which the motor type is indicated in memory location 15a, operating time is indicated in memory location 15b and ageing properties or the like in the memory location 15c. The memory 15" can be constituted by a known writing and reading memory according to the above and the signals for reading/writing are indicated by i10 and i11. The module 2'" controls the motor after identification by means of signal exchange by means of signals i12 and i13 via conductors 26, 25. A unit 27 is provided for establishing position and speed signals i12. A motor driving circuit 28 is provided for establishing a power supply via conductor 25. In the present case, a FLASH memory 29 is included, in which programs 30, 31 are contained for controlling different types of motor, e.g. type A motor 32 and type B motor 33. The signal exchange between the module and the CAN bus is symbolized by i14 and i15. The signal i16 represents an alarm signal or alarm message which appears when an incorrect motor type is connected by mistake. A similar alarm function exists or can be provided also for other types of equipment. Otherwise, reference is to be made to the description above.

In FIGS. 5, 5*a*, 5*b* and 5*c*, components are indicated quite generally in the form of hooks 34 and 35 and a beam unit 36 and associated memory members 37 and 38 respectively. The content of the memory members can be read in accordance with the above. In the embodiment according to FIG. 5, electrical connection members 38' are shown. Otherwise, reference is to be made to the above. Indicated in greater detail is a crane arm 48 and, arranged therein, locking pin(s) 49. Connected to the locking pin is a circuit breaker 50. A recess 51 is intended for electronics or an electronic unit 52 so that a reader 53 can read memory members 57*a*, 57*b* and 57*c* when a rapid fastening 56 is in place.

A connection 54 is assigned to a contact member 61, 75 and 81. In the present case, hydraulic hose connections 55 are included. A hole for said locking pin is indicated by 58. In greater detail, said bodies are indicated by 59*a*, 59*b* and 59*d*. A force sensor is indicated by 60. A hydraulic rotating cylinder 62 is likewise included. Gripping claws are shown by 63 and a further hydraulic cylinder by 64. A hydraulic valve for e.g. the hydraulic cylinder 62 is shown by 65. A memory member also is indicated by 66 and a hydraulic valve is shown by 67 for e.g. the hydraulic cylinder 64. A further memory member is shown by 68 and an electronic unit for the hydraulic valve is indicated by 70. A reader has been symbolized by 71 and 72 indicates a central electric unit for the hydraulic valve 65. 77 indicates a reader. A bus connection 74 is assigned to the electronic unit 22 and the central electric unit 24. A contact member is shown by 75 and 76 indicates hydraulic connections to the hydraulic hose connection 55. A winch 77 and a hydraulic motor 78 are also included. A hydraulic valve 79 is also included as is a further central electric unit 80. A contact member is shown by 81 and hydraulic connections by 82. Quite generally, the equipment can also be arranged to adapt to the system by means of information in the memory member of the equipment. There can be different individual memory members so that a first individual memory member gives a first adaptation, a second individual memory member gives a second adaptation and so on. The different individual memory members can even be assigned to different people, e.g. persons within the same family, enterprise etc. The equipment can then be adapted to the individual memory member assigned to the person, cf. adjustment of chair heights, tools etc.

Figure 6:
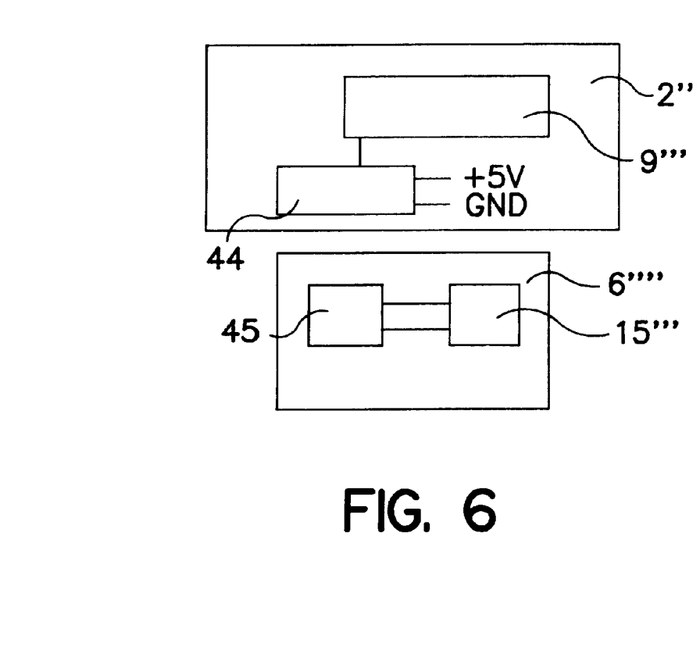
FIG. 6 shows transfer functions by means of induction between the memory member of the equipment and the reading and/or writing member of the module.

In FIG. 6, inductive interconnection of the CPU unit 9''' of the module 2'''' to the memory member 15''' of the equipment 6'''' is illustrated. In this case, use is made of communication unit 44 and 45 in the equipment and the module respectively. Other conductor functions 25', 26' can be constructed according to the above with conventional contact functions.

Figure 7:
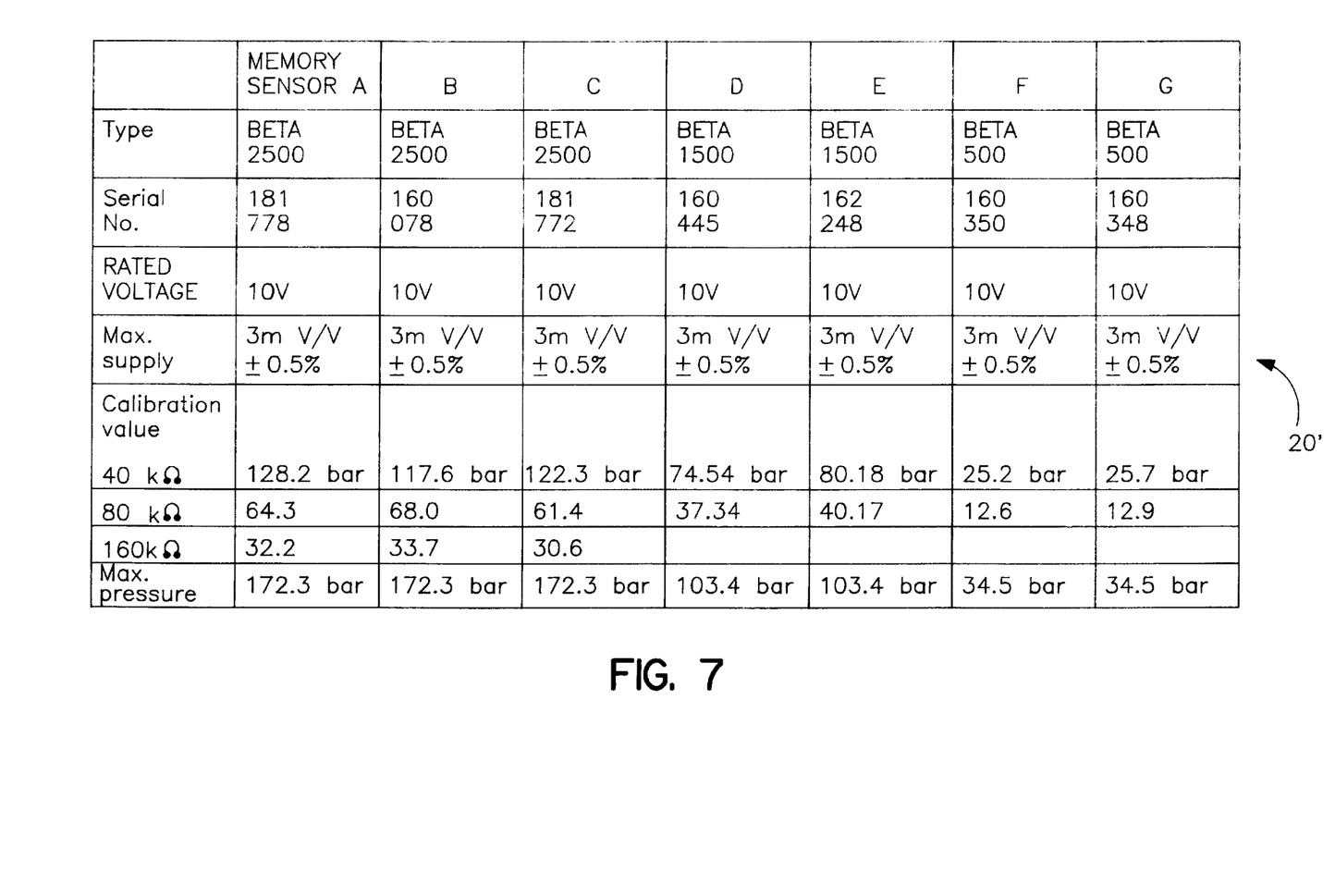
FIG. 7 shows in table form characteristics for equipment, which characteristics are written into the memory member of the equipment.
Figure 8:
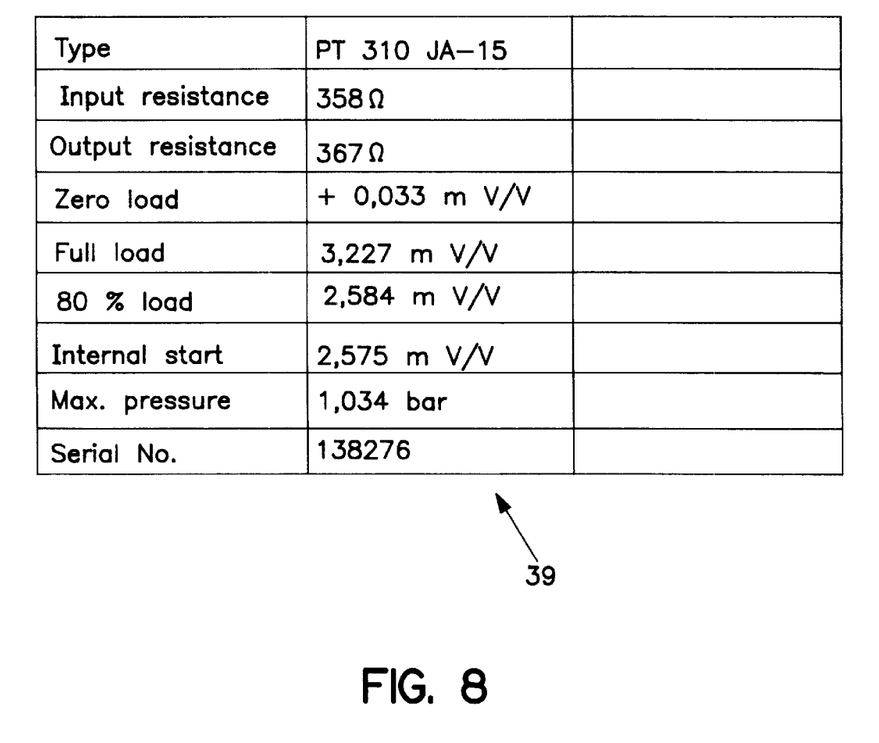
FIG. 8 shows in table form characteristics for equipment which utilizes a memory member which differs from memory members according to the exemplary embodiment according to FIG. 7.

FIG. 8 shows data or information 39 in a memory of type 20 different from the memory type which is indicated in FIG. 7. The sensor in question has a calibration value of a different type from the memory members (BETA) according to FIG. 7 but in both cases the sensor can be controlled and read in the correct manner. By first reading the type, the module can interpret the remaining part of the memory content in the correct manner, make necessary adjustments and also detect if a sensor has been exchanged and the new sensor which replaces the previous one has the same measuring range as before.

Figure 9:
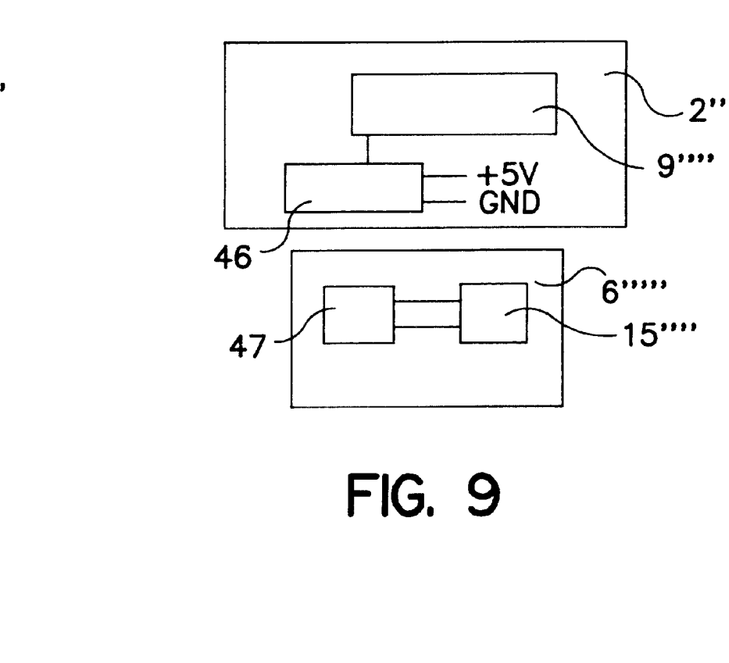
FIG. 9 shows in block diagram form an optical transfer function between module and equipment.

FIG. 9 is intended to show the case of optical transfer between the module 2'''' and the equipment 6'''', units 46 and 47 being arranged to handle the optical transfer function. The memory 15'''' in the equipment is then connected to the unit 47. The units 46 and 47 can in a manner known per se be provided with an optical receiver and transmitter.

The invention is not limited to the embodiment shown in the above by way of example but can be subjected to modifications within the scope of the following patent claims and the inventive concept.

I claim:

1. An arrangement for controlling equipment over a common network comprising:

a serial Controller Area Network (CAN), data network for transferring commands and for receiving data which is sent from distributed locations;

equipment located at a plurality of said locations for executing tasks based on control information received over said network, said equipment being different at each of said locations to carry out different functions, said equipment including a memory which contains data which is read through a first set of contacts on said equipment to identify to said serial network the identity of functions carried out by said equipment;

a plurality of common modules having a second set of contacts connecting to said first set of contacts of said equipment and a third set of contacts connected to said network, each of said modules being capable of being configured to operate with a plurality of different equipment from just reading said memory contents to carry out a function of operating a connected equipment.

2. Arrangement according to claim 1, wherein the module by reading said memory identifies the type of equipment, and establishes a first network system function which differs from a second network system function of a second equipment type.

3. Arrangement according to claim 1, wherein the respective functions are established by means of an exchange of signal(s) between the respective module and equipment.

4. Arrangement according to claim 1, wherein the modules are calibrated with regard to their electrical attributes so that they are mutually exchangeable.

5. Arrangement according to claim 1, wherein the module provides an alarm indication of an incompatible equipment which is connected to said module.

6. Arrangement according to claim 1, wherein the respective module is arranged to sense changes which occur over time by, during one or more periods of time, carrying out measurements in the equipment and statistically processing data obtained from the measurements.

7. Arrangement according to claim 1, wherein the memory of the equipment is arranged to store data from the respective measurement which can respectively be written in from an associated module.

8. Arrangement according to claim 7, wherein a first module writes in data from the respective measurement in the memory, and the data or information is accessible by a second module with which the first module is exchanged.

9. Arrangement according to claim 1, wherein the operating time of the respective equipment is introduced into a respective memory.

10. Arrangement according to claim 1, wherein each module is provided with one or more of its own memory members having data which adapts the module to the network system.

11. Arrangement according to claim 1, wherein one or more modules are made for flexible connection of one or more items of equipment and equipment types having an associated memory, and are equipped with a flexible connection to the network system and a second memory.

12. Arrangement according to claim 1, wherein the equipment includes two or more motors which are of different types.

13. Arrangement according to claim 1, wherein the equipment is equipped with a claw, fork, gripping claw, or winch which can be individually activated for different manipulating measures.

14. Arrangement according to claim 1, wherein the equipment is adapted to the system by means of information in the memory member of the equipment, different individual memory members being provided to provide different adaptations.

15. The arrangement for controlling equipment according to claim 1 further comprising:

sensors located at a plurality of locations for generating data for transmission over said network, each of said sensors having a memory which identifies said sensors to said network through a first set of contacts connected to said memory and sensors; and a plurality of modules having a second set of contacts connecting with said first set of contacts for said modules connecting said sensors to said network, configured from data stored in a respective sensor memory.

16. An arrangement for collecting sensor data comprising:

a serial CAN data network connecting a plurality of locations;

a plurality of sensors at each of said locations, each of said sensors including a memory containing calibration data for said sensor and a first set of contacts; and a plurality of modules having a second set of contacts for connecting to said first set of contacts of said plurality of sensors and their respective memories, and a third set of contacts connecting said modules to said serial data network, said modules receiving data from a connected sensor and calibrating said sensor data by means of said stored calibration data in a respective memory before transferring said sensor data to said network.

17. A method for controlling execution of a plurality of distributed devices connected in a CAN network which perform diverse functions comprising:

storing in a memory associated with each of the devices information about each respective device;

connecting said devices and each respective memory to said CAN network with a plurality of common modules, said common modules having a first set of contacts connected to a set of contacts on said equipment and being configurable to operate one of a plurality of different devices by just reading data, from said memory, and said common modules having a second set of contacts connected to said network; and reading with said module each respective memory through said first set of contacts to determine the characteristics of a respective connected device, and configuring said module in accordance with said characteristics so that said device can perform a respective function.

18. Method according to claim 17, wherein the respective module is configured for the network by means of first data/information stored in a memory of the module characteristic of the network.

19. A method for operating a module which interconnects equipment to a serial data CAN network comprising:

storing in a memory associated with said equipment information related to said equipment;

reading said memory with said module through a first set of contacts on said equipment, and a second set of matching contacts on said module; and varying the configuration of said module to adapt said module to operate with said equipment just based on said read information.

20. The method according to claim 19 further comprising:

reading the contents of a second memory which stores information about said serial data network; and varying the configuration of said module to adapt said module to said serial data network.

21. A network arrangement comprising:

a serial CAN data network connecting a plurality of locations;

a module at each of said locations connected to said serial CAN data network, each of said modules being configurable to communicate with different types of equipment at each of said locations connected to said modules through matching contacts on said module and said equipment; and each of said different equipment types having a memory, for storing information specific to each connected equipment, which configures a connected module to communicate with said equipment whereby information may be exchanged between said equipment and said network.

22. A network arrangement comprising:

a serial CAN network connecting a plurality of locations;

a plurality of equipment distributed around said network wherein each location has a different type of equipment, each equipment having a memory containing data which includes operating parameters specific to said equipment said data being accessible through a set of contacts of said equipment; and a plurality of modules distributed around said network, each module having a set of contacts for connecting with said equipment set of contacts at a respective location, said module including:

a processor means programmed to interrogate the memory of a connected equipment through said connected contacts to identify the type of connected equipment and to obtain data needed to operate said equipment, said processor being further programmed to communicate over said network to exchange signals between said network and said equipment.

23. The network arrangement according to claim 22 wherein said memory includes calibration data for said equipment.

* * * * *